T. DAVIDSON.
PROCESS OF MANUFACTURING GLASS FLOWER BLOCKS.
APPLICATION FILED MAY 12, 1910.

985,785.

Patented Mar. 7, 1911.

Witnesses
M. E. Burrell
C. F. Early

Inventor
Thomas Davidson
By his Attorneys
Baldwin Wight

UNITED STATES PATENT OFFICE.

THOMAS DAVIDSON, OF GATESHEAD, ENGLAND.

PROCESS OF MANUFACTURING GLASS FLOWER-BLOCKS.

985,785.  Specification of Letters Patent.  Patented Mar. 7, 1911.

Application filed May 12, 1910. Serial No. 560,952.

*To all whom it may concern:*

Be it known that I, THOMAS DAVIDSON, a subject of the King of Great Britain, residing at Teams Glass Works, Gateshead-on-Tyne, England, have invented certain new and useful Improvements in Processes of Manufacturing Glass Flowers-Blocks, of which the following is a specification.

The object of this invention is to effect improvements in the manufacture of glass blocks for supporting flowers.

According to this invention sufficient molten glass to form the article is placed in the usual way in a mold of the shape of the bottom and sides of the block and a plunger is inserted in the glass to form the holes. The mold with the glass in it is then turned upside down onto another mold of the shape required for the finished upper part of the article. The glass which is to form the top of the article being still hot falls or drops into this second mold while the glass of the bottom and sides which has been in contact with the first mold having become cooler and more rigid retains its shape.

The accompanying drawings show molds which may be used in this process.

Figure 1:
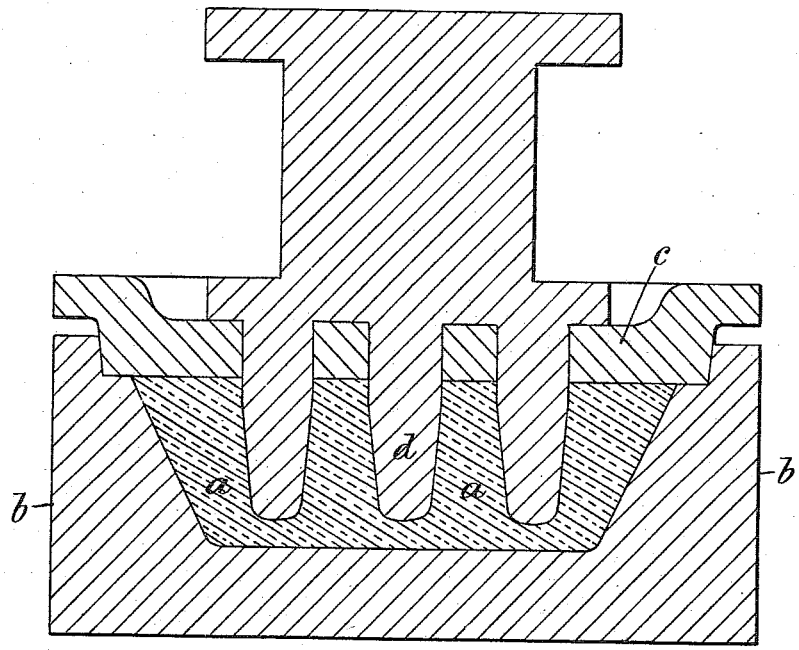
Figure 2:
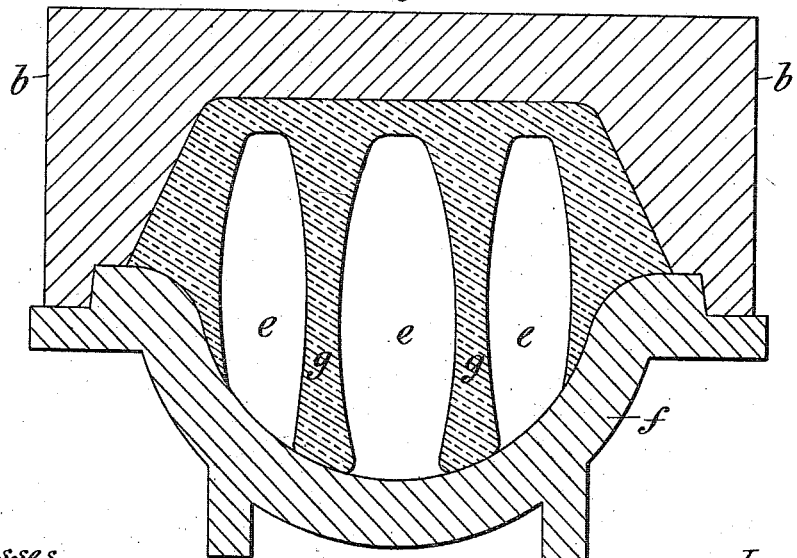

Figure 1 is a section of the mold for forming the bottom and of the plunger for forming the holes and Fig. 2 is a section of the first mentioned mold and of the mold for forming the top of the block.

In making a flower block according to my invention I place sufficient glass $a$ to form the block into a mold $b$. I then place upon the mold a cover $c$ through holes in which I insert plungers $d$ which enter the glass and form holes $e$ therein. I then remove the cover and plunger and place over the mold $b$, a second mold $f$ and then invert the two molds. The mold $f$ is so shaped that it supports the glass around its edges and gives to the central portion of the glass which is still hot enough to run into it, the shape that I desire to give to the top of the finished block. The base of the block having by this time set will retain its shape while the central portion that is the glass $g$ between the holes $e$ being still hot will fall or droop owing to its weight until it meets the inner surface of the mold $f$ enlarging the holes $e$ as shown in Fig. 2 and giving a novel and pretty effect. When the whole has sufficiently set, the block is removed from the molds and the bottoms of the holes may if desired be perforated.

What I claim is:—

The hereindescribed process of making a glass flower block, which consists in placing glass sufficient to form the block into a mold of the shape of the sides and bottom of the block, forming a ridge and depressions in the glass, allowing the sides and bottom of the block to set in the mold, placing upon the sides of the block a second mold of the shape required for the top of the block, inverting the whole while the central ridged portion of the glass is still hot and allowing said central ridged portion of the block to sag into said second mold.

THOMAS DAVIDSON.

Witnesses:
H. NIXON,
FRED. H. DUKE.

---

Copies of this patent may be obtained for five cents each, by addressing the "Commissioner of Patents, Washington, D. C."